Feb. 9, 1965   O. W. OERMAN   3,169,027
HYDRAULIC WHEEL DRAWBAR WITH CASTER WHEELS
Filed March 7, 1962   3 Sheets-Sheet 2
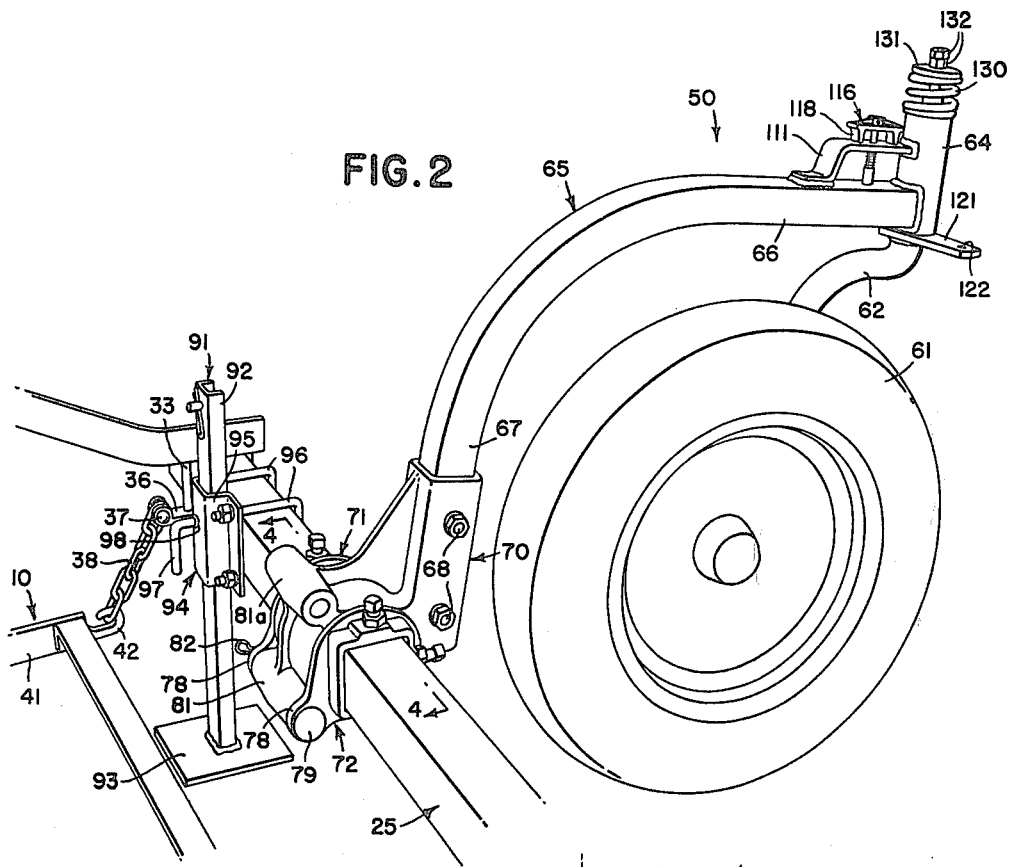
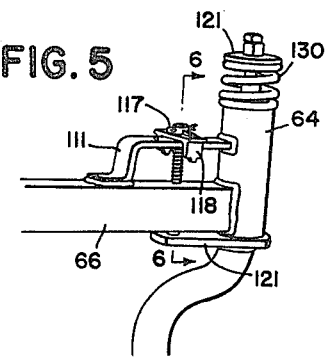
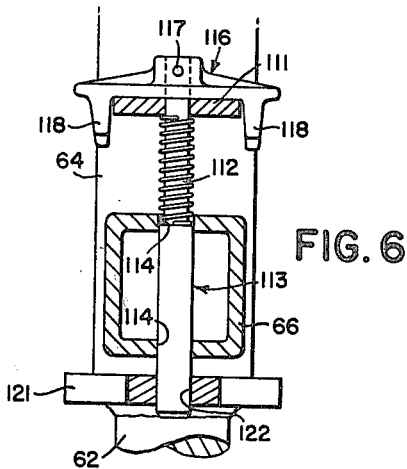
INVENTOR.
OREY W. OERMAN
BY
Roger C Johnson
ATTORNEY

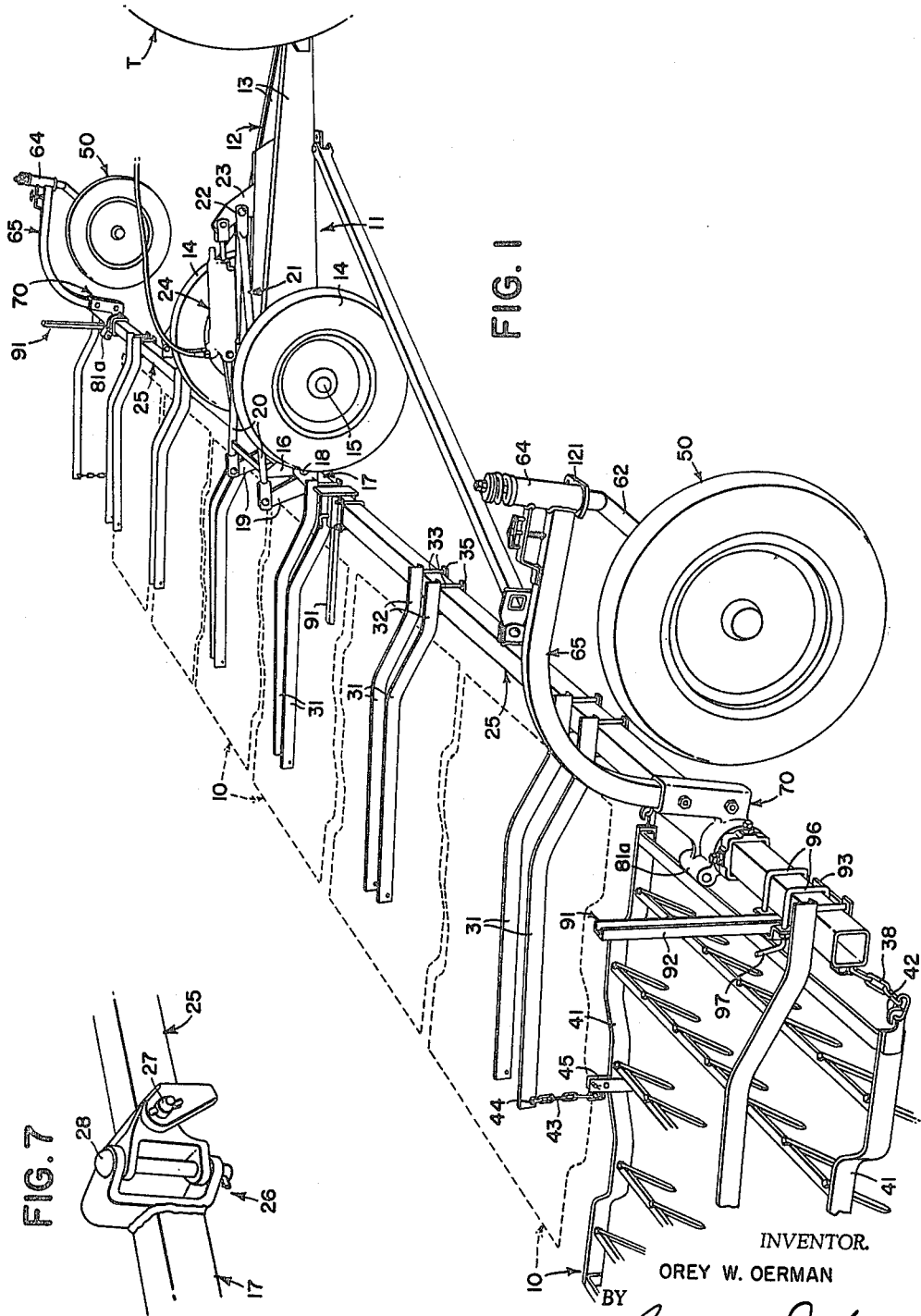

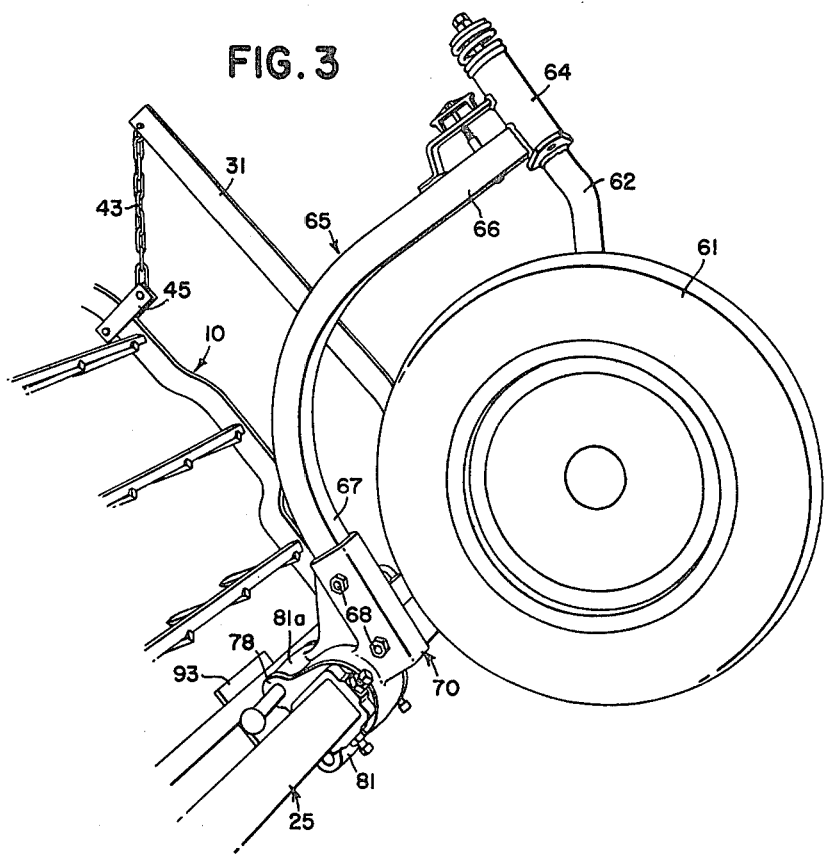
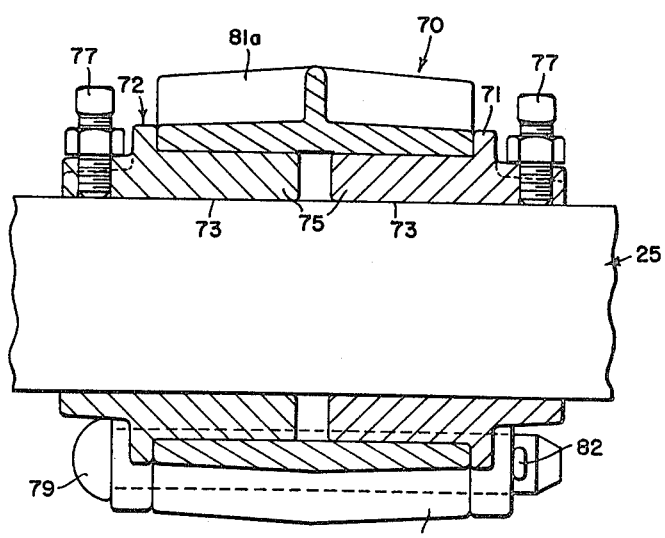

United States Patent Office 3,169,027
Patented Feb. 9, 1965

3,169,027
HYDRAULIC WHEEL DRAWBAR WITH CASTER WHEELS
Orey W. Oerman, Moline, Ill., assignor to Deere & Company, Moline, Ill., a corporation of Delaware
Filed Mar. 7, 1962, Ser. No. 178,017
2 Claims. (Cl. 280—411)

This invention relates generally to agricultural implements and more particularly to ground working implements.

The object and general nature of this invention is the provision of an implement particularly adapted to operate on a fairly wide strip of land, such as an implement having a plurality of implement units, for example, spike- and tine-tooth harrows, yet is so constructed and arranged that the implement is readily foldable into relative narrow compactness and easily movable through gates, along narrow lanes and the like.

A further and more specific object of this invention is the provision of a widespread trailing agricultural implement having means in the nature of caster wheels supporting the laterally outer portions of said implement and disposable in a position to accommodate folding portions of the implement into a narrowed position for transport.

These and other objects and advantages of this invention will be apparent to those skilled in the art after a consideration of the following detailed description of the preferred structural embodiment as illustrated in the accompanying drawings, in which:

FIG. 1 is a perspective view of an implement incorporating the principles of this invention.

FIG. 2 is an enlarged fragmentary perspective view showing certain details of the caster wheel supporting and connecting parts.

FIG. 3 is a view similar to FIG. 2, illustrating the manner in which the caster wheels are rearranged for transport.

FIG. 4 is a fragmentary enlarged sectional view taken along the line 4—4 of FIG. 2.

FIG. 5 is a fragmentary perspective view, showing the castering lock-out means.

FIG. 6 is a fragmentary sectional view taken along the line 6—6 of FIG. 5.

FIG. 7 is a fragmentary perspective view of the universal joint means between the ends of the center bar and the inner ends of the outer bars.

Referring first to FIG. 1, the principles of this invention have been illustrated as incorporated in a wheel supported folding drawbar arrangement particularly adapted to carry a plurality of spike tooth harrow sections, each indicated by the reference numeral 10, the harrow sections 10 being per se conventional so far as the principles of this invention are concerned. The folding drawbar arrangement as shown in FIG. 1 incorporates a wheeled cart or carriage 11 that includes a main frame 12 made up of a pair of laterally spaced forwardly converging frame members 13 supported on a pair of laterally spaced apart wheels 14 journaled on a fixed axle 15. The frame members 13 at their forward ends are adapted to be connected to a tractor T and at their rear ends extend rearwardly beyond the wheels 14 and carry lugs 16 to which a center bar 17, preferably of square cross section, is hingedly connected, as by pin means 18. A pair of upwardly extending arms 19 are fixed to the center bar 17 and pivotally receive the rear portions 20 of a generally fore-and-aft extending yoke 21 that is pivoted at its forward end, as at 22, to a fore-and-aft swinging arm 23 that is actuated by a power cylinder 24. The latter forms a principal portion of the power operated means by which the center bar is rocked about a transverse axis as defined by the pins 18. The power operated means does not per se form any part of the present invention, being disclosed and claimed in U.S. Patent 2,995,385, issued August 8, 1961, to W. V. Lohrman et al.

The implement of this invention also includes a pair of outer bars 25, also square in cross section and, when arranged for normal operation as shown in FIG. 1, these bars 25 are disposed in transverse alinement with the center bar 17, the inner ends of the outer bars 25 being connected by universal joint means 26 (FIG. 7) with the outer ends of the center bar 17, this construction being substantially the same as shown in the Lohrman et al. patent and includes the usual pivots 27 and 28 arranged at right angles to each other. By virtue of the universal joint means 26 just mentioned, whenever the power unit 24 is actuated to rock the center bar 17, the laterally outer bars 25 are also rocked through the same extent, and in addition the outer bars 25 may swing horizontally or vertically relative to the center bar 17.

Each of the center and outer bars 17 and 25 carries a plurality of implement lift arms 31, each of these arms being in the form of an angle member and having an attaching end 32 apertured to receive a U-shaped clamping bolt 33 that embraces the associated center or outer bar. The lower portion of each clamping bolt 33 extends through apertures formed in an associated draft strap 35, the rear end of each of the latter having a bifurcated portion 36 (FIG. 2) apertured to receive an associated draft pin 37 by means of which a draft chain 38 is connected with the associated transverse bar. As shown in FIG. 1, the tools or implement units 10 are in the form of spike tooth harrow sections, each of which includes a pair of side bars 41, and the forward ends of the latter are formed with pig tail connections 42 to receive the associated draft chains 38, whereby the spike tooth harrow sections are disposed in draft-receiving relation with respect to the associated transverse bar. In order to lift the sections whenever the center and outer bars are rocked to elevate the lift arms 31, the rear ends of the latter are slotted and apertured to receive an associated lift chain 43, the upper link of which is extended through the slot and adapted to receive a connecting pin 44 for connecting the upper end of each lift chain 43 to the associated arm 31. The lower end of each lift chain 43 is connected through suitable attaching straps 45 to the adjacent side bar 41 of the associated harrow section. In the construction as so far described, it will be seen that when the center and outer bars 17 and 25 are rocked backwardly and downwardly to the position shown in FIG. 1, the lift arms 31 are disposed in a generally horizontal position, the chains 43 being slack so that when the tractor is driven across the field the harrow sections will follow the ground surface and operate to smooth the ground. If excessive amounts of trash should gather on one or more of the sections 10, the power unit 24 may be actuated to rock the center and outer bars 17 and 25 to raise the lift arms 31 an amount sufficient to free the trash, after which the power unit 24 is extended to lower the sections 10 back into an operating position. Also, the power unit 24 may be actuated to raise the lift arms 31 and the associated harrow sections 10 upwardly off the ground to facilitate making a turn, as at the end of the field.

According to this invention, the wheel means for supporting the outermost ends of the outer bars 25 are in the form of caster wheels so as to facilitate making a turn, as at the end of the field as just mentioned, and such caster wheel means will now be described.

Each caster wheel unit is indicated by the reference numeral 50 and since these units are substantially identical a description of one will suffice for a complete disclosure.

Referring now more particularly to FIG. 2, each caster wheel unit 50 includes a caster wheel 61 journaled for rotation on the lower end of an axle member 62 having an upper spindle section rotatable within the sleeve portion 64 of a generally L-shaped support arm 65 having a normally horizontal portion 66 extending generally forwardly and a rear vertical portion 67 that at its lower end is secured, as by bolts 68, to a bracket 70 rotatably mounted on the outer portion of the associated outer bar 25 by means of a pair of bearing members 71 and 72, each having a squared opening 73 (FIG. 4) to non-rotatably receive the associated bar 25. The bearing members 71 and 72 are provided with inwardly directed sleeve portions 75 on which the bracket 70 is mounted for rocking movement. Each of the bearing members 71 and 72 is provided with set screw means 77 for fixing the bearing members 71 and 72 in selected lateral positions on the associated bar 25. Each of the bearing members 71 and 72 is provided with apertured lug portions 78 (FIG. 2) adapted to receive a securing pin 79, the latter also being adapted to be inserted through an apertured portion 81 carried by the bracket 70, as best shown in FIG. 2. The pin 79 is of the quick-detachable type and may readily be removed by releasing a hairpin retainer 82.

It was mentioned above that the peg tooth harrow sections 10 may be raised off the ground an amount adequate to clear the sections of trash by extending the power unit 24. As will be clear from FIG. 1, however, whenever the power unit is extended and the center and end bars 17 and 25 rocked generally in a clockwise direction, as viewed in FIG. 1, the caster wheels 61 are swung downwardly and rearwardly. The extent of caster wheel movement when raising the section to clear the trash is not excessive, and the caster wheels will readily accommodate the necesary rocking action, particularly when the outfit is stationary. However, somewhat different conditions arise when the lift arms are to be raised substantially through 90° so as to bring the harrow sections to a vertical position and also bring the normally horizontal universal joint pivot to a vertical position to accommodate rearward swinging of the outer bars 25. More specifically, when the center and outer bars 25 are to be rotated through substantially 90° in order to raise the implement sections to the generally vertical position, it is necessary to shift each of the caster wheel support members 65 through substantially 90° in order to dispose the caster wheels 61 in a position supporting the outer bars 25 and associated implement units in lifted positions. The means provided for swinging each caster wheel support 65 through substantially 90° relative to the associated outer bar 25 will now be described.

It will be seen from FIG. 1 that each bracket 70 includes a second sleeve section 81a located substantially 90° with respect to the sleeve section 81 mentioned above. The outer end of each outer bar 25 is provided with a stand 91 that is made up of a vertical channel member 92 having a foot piece 93 secured to the lower end thereof. A stand support 94 is mounted on the outer end of each outer bar 25 and comprises a flanged channel member 95 embracing the stand standard 92 and fixed in position to the associated bar 25 by means of a pair of U-bolts 96. For normal operation the stand is fixed in position to the associated bar 25 with the foot piece 93 in an upper position (FIG. 1) whereby the stand does not ordinarily engage the ground. The stand is locked in different vertical positions by means of a tail bolt 97 screwed into a flanged nut 98 nonrotatably disposed in an opening in the channel member 95 and adapted to bear against the web of the standard 92.

When it is desired to shift the caster wheel units relative to the associated bars from the normal operating position shown in FIGS. 1 and 2 to a position supporting the outer ends of the outer bars 25 after they have been rotated through substantially 90°, the procedure outlined below is followed.

Starting with the parts in positions shown in FIG. 1, the first step is to rotate the center and outer bars a small amount so as to raise the outer ends of the outer bars 25, rotating them through something like 5° or 10°. The tail bolts 97 are then loosened to permit the stands 91 to fall to the ground (FIG. 2), after which the tail bolts 97 are tightened. Next the center and outer bars 17 and 25 are rotated backwardly so as to raise the caster wheels 61 off the ground, the weight of the outer ends of the outer bars 25 being now supported entirely on the stands 91. Next, the pin 79 (FIG. 2) is removed and the power cylinder extended to rock the bars 17 and 25 and raise the lift arms 31 to about a 45° position. Each of the caster wheel axles 65 is raised manually until the upper sleeve 81a comes into alinement with the apertured lugs 78, as shown in FIG. 3. The lock pin 79 may now be inserted, as shown in FIG. 3, the lock pin 79 being secured in fully inserted position by the spring locking pin 82. This fixes the caster wheel in a position rotated through 90° relative to its former position (FIG. 2), so that now the power cylinder may be operated to rock the bars 17 and 25 and raise the lift arms 31 to a generally vertical position. In thus rocking the center and outer bar 25, the weight of the outer ends of the outer bars and associated parts is again imposed on the caster wheels.

The outer bars 25 may now be swung around horizontally to a trailing position for transport, in which the width of the implement is reduced, for example, from approximately 37 feet (FIG. 1) to approximately 8 feet, in one form of this invention, in which the width of the machine when arranged for transport is substantially no greater than the width of the harrow cart itself.

It is undesirable to have the wheels 61 caster during transport for the rear ends of the trailing bars would then tend to swing laterally with no control. Accordingly, I provide castering lockout means which will now be described.

Referring now to FIGS. 2, 5 and 6, an L-shaped bracket 111 is fixed to the axle section 66 and the sleeve 64 and is apertured to receive the narrowed portion 112 of a pin 113 that extends downwardly through apertures 114 in the upper and lower portions of the forward end of the support arm 66. A spring 115 surrounds the upper portion of the pin 113 and bears against the bracket 111 to continually urge the pin 113 downwardly. A locking member 116 is mounted on the upper end of the pin 113 and is held in place thereon by a cotter 117. The locking member 116 includes two downwardly extending legs 118 so that when the locking member 116 is raised and turned to the position (FIG. 2) where the legs 118 rest against the bracket 111, the pin 113 is held in an upper position and the wheel 61 is free to caster. Secured to the member 62 just underneath the sleeve 64 is an arm 121 having an opening 122 therein positioned to receive the lower end of the pin 113 when the caster wheel 61 is turned to a position at a right angle to the plane of the support arm portion 66. When the wheel 61 is in this position the locking member 116 may be turned through 90° (FIGS. 5 and 6) to permit the leg 118 to be disposed on opposite sides of the bracket 111. This will permit the lower end of the pin 113 to enter the opening 122 and thus lock the wheel 61 against castering, as best shown in FIG. 6.

The castering of the wheel 61 is snubbed by means of a spring 130 disposed between the upper end of the sleeve section 64 and a cap 131 held in place by means of a pair of lock nuts 132.

While I have shown and described above the preferred structure in which the principles of my invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A wheeled drawbar for receiving implement units, comprising a wheeled cart having a main frame, a center bar rockably carried thereby for rocking movement about a transverse axis relative to said frame, a pair of outer bars of rectangular cross-sectional configuration, universal joint means connecting the outer ends of said center bar to the inner ends, respectively, of said outer bars, whereby the latter bars may be swung in either a generally fore-and-aft direction or in a vertical direction relative to said center bar when the latter is rocked to a position disposing one of the axes of each universal joint means in a vertical position and the other axis of each universal joint means in a generally horizontal position, a caster wheel for supporting the outer end of each of said outer bars, a supporting axle for each caster wheel including a generally vertical spindle, a support for said spindle including sleeve means within which said spindle may rotate for castering, two bearing members having rectangular openings therein disposed about each of said outer bars, said bearing members having inwardly projecting sleeve portions having a cylindrical outer surface, a journal rockable on said sleeve portions and receiving said support arm, aligned apertured lug portions on each of said bearing members, first and second sleeve sections on said journal adapted to be selectively disposed in alignment with said apertured lug portions, and pin means insertable through said apertured portions and said sleeve sections to hold the standard in one of two selected positions.

2. The invention set forth in claim 1 in which means are provided to lock the vertical spindle to said support to prevent castering when the outer bars are disposed in their transport position, said last-mentioned means comprising, an outwardly extending apertured arm secured to said spindle and normally disposed immediately below said sleeve means, apertured bracket means mounted above said support, a vertically extending pin having one end disposed in the aperture in the bracket, the other end being disposed within the aperture in said arm, means disposed about said pin and engageable with the under surface of said bracket to normally bias said pin downwardly, and a locking cap secured to the top of said pin, a first portion of said cap normally being in engagement with the top of said bracket when the pin is disposed within the aperture in said arm, downwardly depending legs on said cap disposable on either side of said portion when said portion is in engagement with said bracket, the bottom of said legs being engageable with the top of said bracket to hold the pin in a raised position out of engagement with said arm.

References Cited in the file of this patent
UNITED STATES PATENTS

| | | |
|---|---|---|
| 2,787,477 | Melroe | Apr. 2, 1957 |
| 2,828,597 | Moore | Apr. 1, 1958 |
| 2,944,615 | Clark | July 12, 1960 |
| 2,973,818 | Marvin | Mar. 7, 1961 |
| 2,974,737 | Dlugosch | Mar. 14, 1961 |
| 2,995,385 | Lohrman et al. | Aug. 8, 1961 |